Feb. 8, 1944.  W. H. REINHOLZ  2,341,117
FOLDING GO-CART
Filed May 2, 1940  2 Sheets-Sheet 2
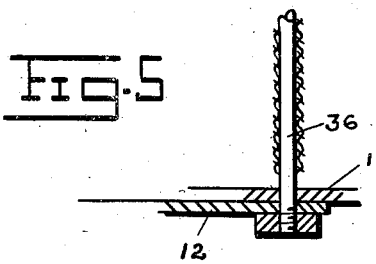
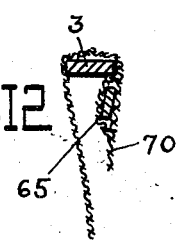
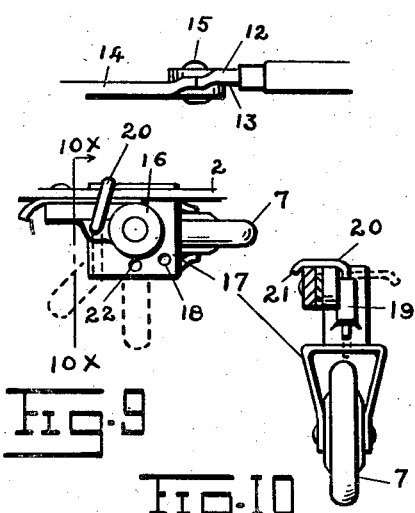
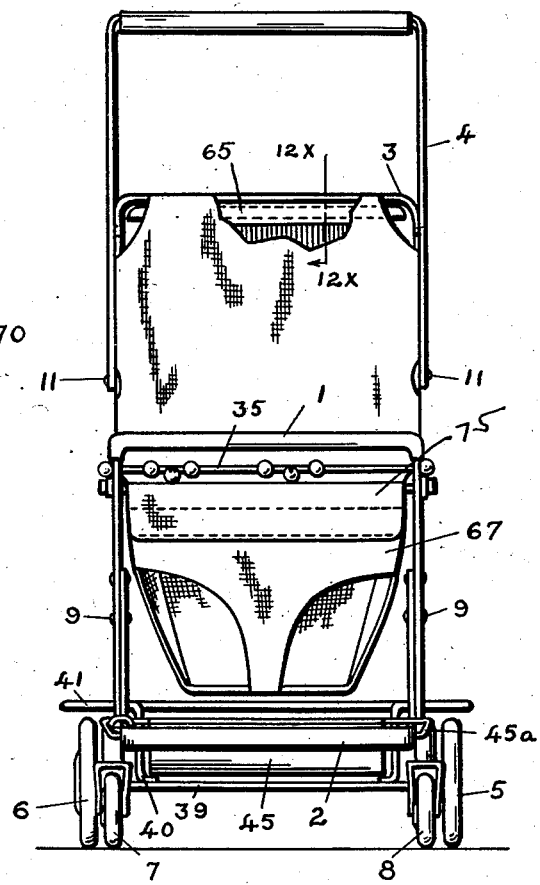
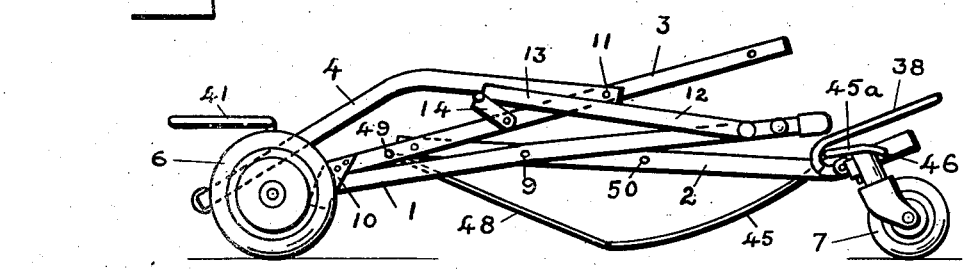
INVENTOR.
William H. Reinholz
BY
Frank Keifer
ATTORNEY.

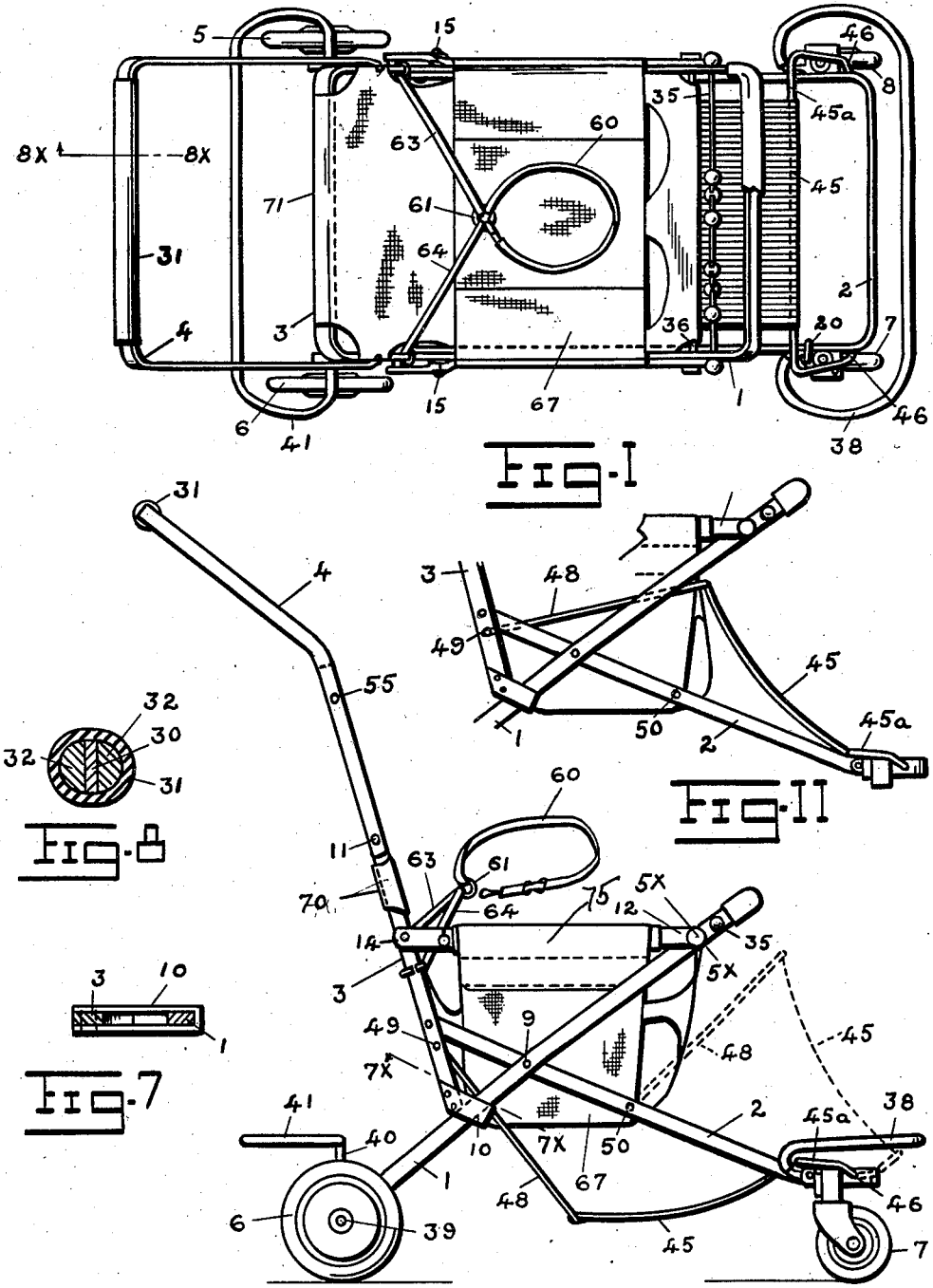

Patented Feb. 8, 1944

2,341,117

UNITED STATES PATENT OFFICE 2,341,117

FOLDING GOCART

William H. Reinholz, Irondequoit, N. Y.

Application May 2, 1940, Serial No. 332,891

11 Claims. (Cl. 155—22)

The object of this invention is to provide an improved go-cart that is collapsible and is intended to be used both as a baby walker and a stroller for babies.

Another object of the invention is to provide the stroller with fixed rear wheels and front caster wheels.

Another object of the invention is to provide a permanently attached foot rest that can be placed in a lower or upper position, in the lower of which positions it will act as a foot rest while the go-cart is used as a stroller, as shown in Figure 2, and when swung into the upper position it is out of the way so that the baby's feet can rest on the ground and the go-cart can be used as a baby walker.

Another object of the invention is to provide a foot rest that keeps the baby's feet off of the pavement when the go-cart is used as a stroller, and on which the baby can stand when it stands up in the go-cart.

Another object of the invention is to provide a positively attached foot rest that can be placed in one position on the frame between the baby's feet and the ground, in which position it will act as a foot rest and the go-cart can be used as a stroller, and which foot rest without being detached from the frame can be placed in another out-of-the-way position so that the baby's feet can rest on the ground and the go-cart can be used as a baby walker.

Another object of the invention is to provide a frame with said adjustable foot rest positively attached thereto as a foot rest, that can be folded into a narrow package without removing the foot rest.

Another object of the invention is to provide a positively attached foot rest that can be placed in one position on the frame between the baby's feet and the ground, in which position it will act as a foot rest and the go-cart can be used as a stroller, and which foot rest without being detached from the frame can be placed in another out-of-the-way position so that the baby's feet can rest on the ground and the go-cart can be used as a baby walker, in combination with a cross bar on the frame which the baby can take hold of when the go-cart is used either as a stroller or a baby walker.

Another object of the invention is to provide a lock for the fork of one of the caster wheels, which will hold the wheel at an angle to the frame of the go-cart, so that when it is used as a baby walker it will travel in a circle of small diameter.

Another object of the invention is to provide the go-cart with a high back of fabric extending above baby's head supported on a metal frame.

Another object of the invention is to provide the go-cart with a fabric seat and back that can be easily removed for the purpose of washing it.

Another object of the invention is to provide a fabric seat and back with two openings through which the legs are inserted, the legs being divided by a soft, narrow fabric portion making it possible for the baby to walk in comfort without having its legs spread apart thereby.

Another object of the invention is to provide a handle that comprises a flat metal cross bar and a flexible rubber tube thereon with half-round wooden moldings on each side of the flat metal cross bar to fill out the rubber tube and hold it stiff and round.

Another object of the invention is to provide the go-cart with a safety belt that is mounted to slide up and down on the frame and adjusts itself to the baby as the baby stands or sits.

Another object of the invention is to provide a handle that is pivoted on the back and swings independent of the back.

These and other objects of the invention will be illustrated in the drawings, described in the specification, and pointed out in the claims at the end thereof.

In the drawings:

Figure 1 is a top plan view of the go-cart used as a stroller.

Figure 2 is a side elevation of the go-cart shown in Figure 1.

Figure 3 is a front elevation of the go-cart shown in Figure 1, viewed from the right, with the front bumper omitted.

Figure 4 is a side elevation of the frame of the go-cart shown in Figure 2 folded or collapsed, with the fabric material omitted.

Figure 5 shows an enlarged sectional view on the line $5x$—$5x$ of Figure 2, showing the end of the bar that is removable for the purpose of permitting the removal of the fabric of the go-cart.

Figure 6 is an enlarged detail view of one of the stay hinges.

Figure 7 is a cross section on the line $7x$—$7x$ showing the sliding connection between the ends of the back frame and the frame that is supported on the back wheels.

Figure 8 is a section through the handle on the line $8x$—$8x$ of Figure 1.

Figure 9 is an enlarged top plan view of the mount and lock for one of the caster wheels.

Figure 10 is a section on the line 10x—10x of Figure 9, looking in the direction of the arrow.

Figure 11 is a detail view of a portion of the frame with the plate 45 and the long bail 48 in a position intermediate to that shown in full lines and in dotted lines in Figure 2.

Figure 12 shows a section on the line 12x—12x of Figure 3, showing the pocket and the bridge held therein under the cross bar forming the upper part of the member 3.

In the drawings like reference numerals indicate like parts.

This go-cart comprises four U-shaped members, each made of flat stock, which members are indicated by the reference numerals 1, 2, 3 and 4. The U-shaped member 1 is supported by the axle of the rear wheels 5 and 6. The U-shaped member 2 is supported by the front caster wheels 7 and 8. These two members 1 and 2 cross each other and are held together by the pivots indicated at 9. The bottom of each side of the U-shaped member 3 is provided with a yoke 10, which has a sliding engagement on the two sides of the member 1, so that it can move from the position shown in Figure 2 to the position shown in Figure 4, keeping sliding engagement therewith. The U-shaped member 4 is pivoted on the member 3 at 11, and when the go-cart is collapsed it can be swung nearly 180 degrees on the member 3 to the position shown in Figure 4. The members 1 and 3 are connected together by a bar or link 12 made of two pieces 13 and 14 hinged together at 15. These parts are so shaped at the hinge that above the pivot the ends of the members will come into direct abutment so that the two parts are held in a straight line shown in Figure 2, making a stay hinge.

At the lower end of the member 2 are provided the bearing blocks 16 in which the stems of the casters are swiveled, caster stem sockets being provided such as are regularly used on furniture in connection with all casters. One of these casters with its stem is free to turn in any direction. The other is also mounted so that it will turn in any direction, or it can be locked in one or more fixed positions for a purpose that will now be described.

The yoke 17 in which one of the caster wheels is mounted is provided with a hole 18 in the top thereof. On the bearing block 16 of the one caster is provided a socket 19, in which is mounted a bent pin 20. This bent pin is so called because the upper portion of it is bent over and down at 21 and hooks over the frame 2, in which position it is held up out of engagement with the hole 18, leaving the yoke 17 and its caster wheel free to swing on its vertical axis. When the pin is raised up and turned so as to be free from engagement with the frame 2, and the yoke 17 is turned around to bring the hole under the pin, as shown in Figure 10, the pin can then be pushed down into the hole, which will lock the yoke in that particular position and hold the caster wheel at an angle to the frame, so that the go-cart will travel around in a circle, which is desirable when it is used as a baby walker. In such case the free caster wheel will assume a position parallel to the fixed caster wheel. Another hole 22 can be provided, which will hold the caster wheel at right angles to the frame, so that whether the go-cart is used either as a stroller or a baby walker it will hold it practically stationary, thereby causing the caster wheels to act as a brake and holding the go-cart against forward or backward motion.

As shown in Figure 3, the handle consists of a flat metal cross bar 30, being part of the member 4. On the member 4 is slipped a flexible rubber tube 31, which is brought to correct position on the cross bar 30. Half round wooden strips 32, 32 are then inserted in the open end of the rubber tube. These fill out the rubber tube and form it into a round handle. These strips can be glued inside of the rubber tube, so as to form a permanent handle on the member 4. A similar tube can be fastened on the upper end of the member 1, which will form a handle that the baby's hands can take hold of.

Near the upper end of the frame 1 is a cross bar 35 that holds beads and bells, and a little lower down on the member 1 is a cross bar 36 on which the links 12 are pivoted. At the lower front end of the member 2 a bumper 38 is provided which is covered by a rubber tube, so that it will not damage the furniture when the bumper bumps into it.

A bumper is also provided at the back of the go-cart, which bumper is supported as follows: The shaft 39 that supports the rear wheels is flattened just inside of the frame 1, and the shaft is perforated to receive the upright members 40 of the bumper 41, which bumper is shaped so that it extends laterally out over the rear wheels and then rearwardly and across in a U shape.

A plate 45 is provided, to be used as a foot rest for the baby's feet. This plate is supported front and back as follows: The front and back edge of the plate is formed with a rolled edge. A U-shaped bail engages in each of these rolled edges, on which the plate can swing. The front bail 45a is short and extends laterally out over the frame and then forward along or parallel to the frame, and has inturned ends 46 that engage in the frame, on which it can swing. These ends are upset, so as to be permanently fastened in the frame.

At the rear end of the frame a long bail 48 is provided which has out-turned ends that engage in holes 49 in the member 3. As shown in full lines in Figure 2, this plate 45 is in position to be used as a foot rest. By disengaging the bail 48 from the holes 49, the foot rest 45 can be turned up to the dotted line position and the ends of the bail can then be engaged in the holes 50 in the member 2, in which case the bail 45a will assume the dotted line position shown at the lower right hand corner of Figure 2. In the dotted line position the foot rest 45 is out of the road, so that the baby's feet can rest on the ground and the baby can walk without even its knees touching the plate.

In order to hold the handle 4 positively in the position shown in Figure 2, holes are provided in the member 3 and pins or studs 55 are provided on the member 4. These studs positively engage in the holes in the member 3, so as to insure the holding of the handle in the position shown in Figure 2 for all practical purposes, it being understood that when the go-cart is collapsed the sides of the member 4 can be sprung outwardly, so as to disengage the studs from the holes and permit it to swing to the position shown in Figure 4.

A safety belt 60 is provided which goes around the baby, one end of which is permanently connected to the round ring 61 and the other end connects to the ring 61 by a snap fastener. Also fastened to this ring are the straps 63, 64, which on their outer ends carry D rings, which are slidably mounted on the sides of the member 3. These D rings have a travel of several inches up and down on the member 3, so that they can adjust themselves to any position which the baby may take.

The fabric seat 67 engages over the top and sides of the member 3, and engages over the bars 12, and engages over the cross bar 36. A pocket is provided to engage over the member 3 and sleeves are provided to engage over the bars 12 and 36. The bars 12 can be detached at their forward ends and the bar 36 can be removed, for the purpose of removing or putting the fabric seat in place.

As shown in Figure 11, the plate 45 and long bail 48 can be put in an intermediate position. In this case the bail 48 will remain engaged with the holes 49. The front bail 45a is swung up and forward and the plate 45 and bail 48 is put in a raised position, after which the front bail 45a is returned to its original position, holding the parts in the position shown in Figure 11.

As shown partly broken away in Figure 3 and in section in Figure 12, I form a narrow sleeve 65 extending transversely across the fabric of the back. In this sleeve is placed a wooden bridge that can be inserted from either end. This bridge is rounded off at the upper corner of each end and normally fits under the cross bar at the top of and forming part of the member 3. When the child sits on the seat, this wooden bridge is drawn up under the cross bar and holds the fabric of the back properly in place at the top, that is, it keeps it from sagging and keeps it in neat appearance, that is, it holds the seam in the fabric at the top of the back properly in place on top of the cross bar and in line therewith.

As shown at 70, the fabric back of the fabric seat has a sleeve formed thereon which slips down over the handle to the position shown in Figure 2. Thereafter, the member 4 can be rocked back on the pivots 11, and the pocket 71 formed in the top of the fabric back can be slipped over the member 3, and when it is fully in place the member 4 can be returned to the position shown in Figure 2.

As shown in Figure 2, the fabric 75 of the seat is formed with two seams shown in dotted lines thus forming two sleeves therein. The bar 12 is shown engaged with the top sleeve, but it can also be engaged with the lower sleeve instead for the purpose of raising the seat. Similar seams are shown by dotted lines in the fabric 75 just below the cross bar 35 forming two sleeves therein, either of which sleeves can be engaged with the cross bar 36 for the purpose of changing the height of the seat.

I claim:

1. A go-cart having two U-shaped members which cross each other and which are pivoted together, two wheels mounted at the lower end of each of said members, an upright strut member at the back for holding the rear ends of said first two members from moving toward each other said upright member being pivoted to one of said first two members, a horizontal member extending on each side from the upright member forward to the other of the first two members for tying together said upright member and said other of the first two members, a fabric seat supported on three sides from the upright member and the two horizontal members, a cross bar mounted on said other of said first two members for supporting the front of said fabric seat.

2. A go-cart having two U-shaped members which cross each other and are pivoted together, an upright U-shaped member at the back for holding the two first members in fixed relation to each other, a foot rest which comprises a plate, a narrow bail pivotally mounted on the rear end of the plate and a wide bail pivotally mounted at the front end of the plate, the narrow bail having long arms which extend up and rearwardly and have out-turned ends that engage normally in the upright member, the wide bail having short arms that extend forward and down with in-turned ends that engage with the forward end of one of said first named U-shaped members, the wide part of the bail attached to the forward end of the plate resting on top of said U-shaped member.

3. A go-cart having two U-shaped members which cross each other and which are pivoted together, two wheels mounted at the lower end of each of said members, an upright strut member at the back connected to the two first named members so as to hold them in fixed relation to each other, a horizontal member extending on each side from the upright member forward to one of the first named U-shaped members for holding the members in fixed relation to each other, said one of the first named U-shaped members extending above the horizontal members and a cross bar forming an integral part thereof for the baby's hands to rest on, a second cross bar removably supported in said one of the first named U-shaped members, and a seat supported by said horizontal members and said second cross bar.

4. A go-cart having two U-shaped members which cross each other and which are pivoted together, two wheels mounted at the lower end of each of said members, an upright strut member at the back connected to the two first named members so as to hold them in fixed relation to each other, a horizontal member extending on each side from the upright member forward to one of the first named U-shaped members for holding the members in fixed relation to each other, said one of the first named U-shaped members extending above the horizontal members and a cross bar forming an integral part thereof for the baby's hands to rest on, a second cross bar removably supported in said one of the first named U-shaped members, and a seat supported by said horizontal members and said second cross bar, each of said horizontal members being formed of a long link and a short link, said links being pivotally connected near the lower edge and abutting against each other near the upper edge by which the two links are held in a straight line and the go-cart is held in open condition, permitting the folding of the members of the go-cart into a narrow package said upright member being pivotally connected to one of said first two U-shaped members and slidably connected to the other of said first two U-shaped members.

5. A go-cart having a frame comprising two U-shaped members which cross each other and which are pivoted together, an upright member at the back pivoted to one of the said members and having a yoke maintaining sliding engagement with the other member, a horizontal member extending on each side from the upright member forward and pivotally connected to one of the U-shaped members, each of said horizontal members being formed of two links, said links being pivotally connected to each other near their lower edge and abutting against each other near their upper edge, by which abutment the two links are held in a straight line and the members of the go-cart are held in open condition, the joints of said members permitting the links and the members of the go-cart to be folded into a narrow package.

6. A go-cart having a frame comprising two U-shaped members which cross each other and which are pivoted together, an upright member at the back pivoted to one of said members and having yokes at the bottom thereof maintaining sliding engagement with the other U-shaped member, means for holding said upright member in proper relation with the first named U-shaped members, said upright member being U-shaped and having a yoke at the top, a fabric back having an inverted pocket at the top engaging over the upright member, a sleeve in said pocket at the top thereof, a bar adapted to fill said sleeve and engage under the yoke of the upright member to hold the fabric back in place.

7. In a go-cart, the combination of: a pair of horizontally spaced parallel forwardly and downwardly inclined first side members fixedly related to each other; a pair of horizontally spaced parallel rearwardly and downwardly inclined second side members fixedly related to each other having a pivotal connection to said first side members respectively; a supporting wheel at the lower end of each of said side members; a pair of upright members pivoted at points intermediate their ends to the upper ends respectively of said first side members and slidably supported at their lower ends on said second side members respectively below the pivotal connections of said first and second side members; a pair of horizontal tie members each pivotally connected at its ends to the upper end portions respectively of corresponding ones of said upright and second side members, each of said tie members being articulated on a horizontal axis intermediate its ends; and a seat supported by said tie members.

8. The combination defined in claim 7 in which the articulation of said tie members consists of an upwardly flexing knee joint intermediate its ends.

9. In a go-cart, the combination of: a wheeled frame providing sides between which there is an unobstructed space for the positioning of a child's body and legs; a seat mounted on said frame between said sides; a footrest; relatively short linkage means connecting the front end of said footrest with the front portion of said frame at a low level; means for supporting said short linkage means on said frame in each of two widely separated angular positions on opposite sides of the vertical; and relatively long linkage means pivotally connected at its front end to the rear end of said footrest and pivotally connectible at its rear end to said frame at each side thereof, the connection between said relatively long linkage means and said frame comprising a pivot portion on the rear end of said linkage means and two complementary pivot bearings longitudinally spaced in the corresponding side of said frame, said pivot portion having detachable engagement with a selected one of said two pivot bearings, whereby the footrest may be placed either under the feet of a child sitting in the seat, or at a substantially more forward portion of said frame in a position in front of the legs of a child standing in front of the seat.

10. In a go-cart, the combination of: a wheeled frame providing sides between which there is an unobstructed space for the positioning of a child's body and legs; a seat mounted on said frame between said sides; a foot rest; relatively lonk linkage means disposed laterally outside of said seat and articulately connecting the rear end of said footrest with a rear portion of said frame; and a relatively short linkage means articulately connecting the front end of said footrest with a forward portion of said frame at a low level, said footrest and two linkage means having a combined length greater than the distance between said frame portions and having relative lengths such that when in a downwardly bowed articulated position said footrest is placed in a substantially horizontal position below said seat and suitable for receiving the feet of a child sitting in said seat and such that said short linkage means when it is swung from an initial position up and forwardly through a limited angle about said articulated joint with the forward portion of the frame, thereby elevating the footrest and long linkage means, and then is returned to its initial position, places said footrest in an upwardly bowed gravity locked position in front of the legs of a child standing in front of said seat; and means on said frame for gravity supporting in said initial position that end of said short linkage means which is connected to said footrest and thereby preventing said end from swinging downwardly, whereby said footrest and rear linkage means when placed in upwardly bowed position are locked against downward articulated movement.

11. In a go-cart, the combination of: a wheeled frame providing sides between which there is an unobstructed space for the positioning of a child's body and legs; a seat mounted on said frame between said sides; a footrest; means for pivotally connecting the front end of said footrest with the front portion of said frame at a low level; and linkage means pivotally connected at its one end to the rear end of said footrest and detachably connected at its other end to said frame at each side thereof, each of said detachable connections comprising a pivot portion on said other end of said linkage means and two complementary pivot bearings in the corresponding side of said frame spaced longitudinally thereof, said pivot portions being normally engaged with the rearmost of said pivot bearings, whereby said footrest during said normal engagement is disposed under the feet of a child sitting in the seat or may be tilted forwardly and upwardly about said front pivotal connection means, upon detaching said linkage means from said pivot bearings, and may be held in a position in front of the legs of a child standing in front of the seat by engaging said pivot portions in the forward pivot bearings.

WILLIAM H. REINHOLZ.